Dec. 13, 1960

F. A. BUSSE ET AL 2,964,684

CONTROL APPARATUS

Filed Dec. 3, 1954

INVENTORS
FRANCIS A. BUSSE
JOHN F. FLANNERY
ALBERT E. STONE

BY *George H Fisher*

ATTORNEY

United States Patent Office 2,964,684
Patented Dec. 13, 1960

2,964,684

CONTROL APPARATUS

Francis A. Busse, Des Plaines, John F. Flannery, Lincolnwood, and Albert E. Stone, Western Springs, Ill., assignors to Minneapolis-Honeywell Regulator Company, Minneapolis, Minn., a corporation of Delaware Filed Dec. 3, 1954, Ser. No. 472,836

7 Claims. (Cl. 317—123)

This invention relates generally to control apparatus and is more particularly directed to means for the elimination of the effect of undesired quadrature and stray signals.

In the past considerable time and effort have been expended on suitable means for eliminating the effect of quadrature and stray signals in control apparatus using bridges where it is necessary to locate the bridge a considerable distance from the rest of the circuit. A common method used to eliminate the effect of these undesired signals is to place a compensating network on the input to the control apparatus. This compensating network has, however, to be changed or adjusted for each installation. In our invention it will be seen that this network is eliminated and that regardless of the nature of the installation, the undesired signals have no effect on the operating characteristics of the control apparatus.

In addition to eliminating quadrature effects in the control apparatus, the present invention also provides a simple and efficient arrangement for combining signals.

The present improvements will be better understood on consideration of the following specification and drawings which show a circuit embodying the features of our invention.

Figures 1, 2:
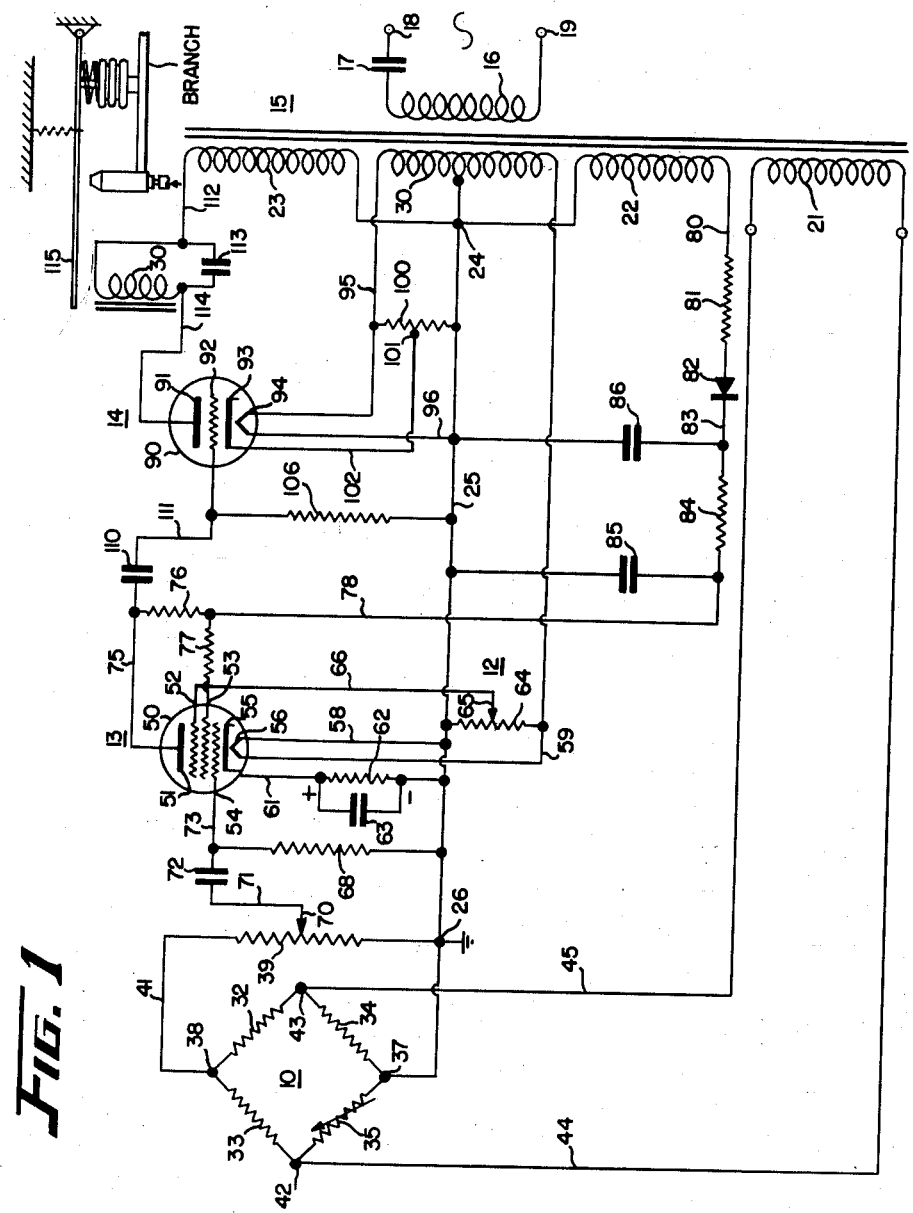
Figure 1 shows the preferred embodiment of our invention in a temperature control circuit.
Figure 2 shows wave forms explaining the operation of the circuit shown in Figure 1.

Referring now to Figure 1 which shows schematically, a first signal source 10 comprising a bridge, the balance of which may vary in response to changes in a condition such as temperature, a second alternating signal source 12, which may be adjusted in any suitable manner, a signal combining and amplifying stage 13, a voltage amplifying stage 14 which further amplifies the resultant of the two signals, and is in turn connected to a control relay coil 30, and a transformer 15, for supplying voltages to the various elements of the circuit.

Transformer 15 comprises a primary winding 16 and for voltage regulation, condenser 17 is serially connected with primary winding 16 and terminals 18 and 19 which are in turn adapted to be connected to a suitable source of alternating current. The transformer 15 also has secondary windings 22 and 23, one terminal of each of said windings being connected to terminal 24 which is connected to ground lead 25 connected to ground through terminal 26. Another secondary winding, 21, is provided for bridge excitation voltage. A further secondary winding 30 has a center tap also connected to terminal 24 and thence to ground lead 25. Capacitor 17 is provided to operate the transformer in a saturated region and thus provides a regulated output despite variations in line voltage.

Bridge 10 comprises fixed resistors 33, 32 and 34, a temperature responsive resistor 35, output terminals 37 and 38 connected to potentiometer resistor 39 through leads 25 and 41 and input terminals 42 and 43 connected to secondary winding 21 through leads 44 and 45. It is to be noted that while the bridge is shown as being energized from an alternating voltage source it could also be energized from a direct voltage source.

Signal combining and amplifying stage 13 comprises an electronic valve 50 preferably of the gated beam type, having an anode 51, a quadrature control electrode 52, a screen electrode 53, a limiter control electrode 54, a cathode 55, and a cathode heater 56, the latter being energized from one-half of secondary winding 30 through leads 25, 58 and 59. A 6BN6 is an example of the valve above referred to and is characterized by having two or more control electrodes, each having substantially equal control over the conduction of the valve. Cathode 55 is connected to ground lead 25 through lead 61 and resistor 62 having a capacitor 63 in parallel therewith. An alternating signal from potentiometer resistor 64 which is connected across one-half of secondary winding 30, is applied to the quadrature control electrode 52 from tap 65 on potentiometer resistor 64 through lead 66. Limiter control electrode 54 is connected to ground lead 25 through resistor 68. A signal from bridge 10 is applied to electronic valve 50 from an adjustable tap 70 on resistor 39, through lead 71, capacitor 72 and lead 73 to limiter control electrode 54. The adjustment of tap 70 determines the proportion of the output of the bridge to be applied to limiter control electrode 54. The anode 51 and screen electrode 53 are supplied with a direct current derived from secondary winding 22 which flows through lead 80, resistor 81, rectifier 82, lead 83, resistor 84, lead 78 and resistor 77 to screen electrode 53, and also from lead 78, resistor 76 and lead 75 to anode 51, cathode 55, lead 61, resistor 62 and lead 25 to complete the circuit. Capacitors 85 and 86 are placed across the output of rectifier 82 to further smooth out the rectified voltage.

Amplifier stage 14 comprises an electronic valve 90 having an anode 91, a cathode 93, a control electrode 92 and a cathode heater 94, the latter being energized from one-half of secondary winding 30 through leads 95, 96 and 25. A resistor 100 is connected across one-half of secondary winding 30 and cathode 93 is connected to a center tap 101 of resistor 100 through lead 102. Control electrode 92 is connected to ground lead 25 through resistor 106. The output of the signal combining and amplifying stage 13 is applied to the control electrode 92 through capacitor 110 and lead 111. The anode 91 of electronic valve 90 is energized with an alternating voltage from secondary winding 23 through lead 112, relay winding 30, lead 114, anode 91, cathode 93, lead 102, one-half of resistor 100 and ground lead 25. A capacitor 113 is connected in parallel with relay coil 30 to filter the output of tube 90. Relay coil 30 exerts a force on armature 115 proportional to the output current of electronic valve 90. Armature 115, for instance, controls the exhaust of air from a pneumatic bleed nozzle.

Figure 2 illustrates the operation of our invention. Curve 130 represents the alternating voltage signal being applied to quadrature control electrode 52. Normally the alternating signal being applied to quadrature control electrode 52 is substantially larger than the signal being applied to limiter control electrode 54. Curve 131 represents the alternating signal appearing across the output terminals of bridge 10. It is to be noted that the output signal from bridge 10 may be either in phase or 180 degrees out of phase with the signal appearing on the quadrature control electrode represented by curve 130. Curve 132 represents a quadrature signal developed due to capacity unbalance of the bridge or input circuit. It is to be noted that the quadrature signal is either 90° or 270° out of phase with the signal applied to quadrature control electrode 52. Curve 133 represents the resultant of curves 131 and 132 and is the actual signal being applied to limiter control electrode 54 when a quadrature signal is present. Curve 134 represents the output of electronic valve 50 when the signals as shown are applied to control electrodes 52 and 54.

It is seen that curve 130, being of a relatively large magnitude, will increase or decrease in magnitude when an in phase or 180° out of phase signal, curve 131, is combined with it. However, when a quadrature, curve 132, or other out of phase signal is combined with curve 131, curve 130 will become distorted but its magnitude will remain the same. This is illustrated by curve 134 which is the resultant of curve 133 and curve 130 and which shows an increase in magnitude equal to the valve of the in phase signal, but displaced slightly due to the quadrature signal.

In order to aid those skilled in the art in constructing control apparatus in accordance with our invention, the following table is appended, giving values of the various elements used in one embodiment of our invention:

| Reference characters: | | Values |
|---|---|---|
| 17 | microfarads | 3 |
| 62 | ohms | 330 |
| 63 | microfarads | 25 |
| 64 | megohms | 5 |
| 68 | do | 1 |
| 72 | microfarad | .25 |
| 76 | ohms | 68,000 |
| 77 | do | 15,000 |
| 81 | do | 150 |
| 84 | do | 15,000 |
| 85 | microfarads | 20 |
| 86 | do | 20 |
| 90 (gated beam type tube) | | 6BN6 |
| 106 | megohms | .47 |
| 100 | ohms | 300 |
| 110 | microfarad | .047 |
| 113 | do | 16 |

*Operation*

Turning now to the operation of the circuit, primary winding 16 is energized from a suitable source of alternating voltage. Tap 65 on potentiometer 64 may be adjusted to provide the control point of a desired operating range. Now, with the signal as described, applied to the quadrature electrode 52 and with no signal applied to the limiter electrode 54, the output of the signal combining an amplifier stage 13 is of the same wave form as the signal applied to quadrature electrode 52. The relay will be energized at a constant value which is determined by the magnitude of the signal applied to quadrature electrode 52.

Turning now to the temperature responsive bridge circuit, and assuming a change in temperature occurs, the bridge is unbalanced and the resulting signal output from the bridge is applied to the limiter electrode 54. The signal being applied to the limiter electrode 54 may be either in phase or 180° out of phase, depending on the direction of unbalance, with the signal already applied to the quadrature electrode 52. It is seen that these two signals will either add or subtract, but assuming they are in phase, the signal from the bridge will be added to the signal on the quadrature electrode 52 and the output will be larger in magnitude, relay coil 30 will have a larger current flow through it and will tend to attract the armature 115 with a greater force and thereby cause the device connected to the armature 115 to operate in accordance therewith. In this case the device will act to cause a greater supply of heat and thereby restore bridge 10 to a balance.

Assuming now, that it is necessary to locate bridge 10 a considerable distance from the rest of the circuit, and that a quadrature signal due to the capacity of the long signal leads and stray signal due to crossing power lines and the like, is applied to limiter control electrode 54 with the signal appearing across the output terminals of bridge 10, the operation will be substantially the same as above described, with the exception that a small amount of distortion due to the stray signal and the quadrature signal will appear as shown on curve 134. It will be noted, however, that the increase or decrease in the magnitude of the output of signal combining and amplifying stage 13 remains the same.

While we have shown and described a preferred embodiment of our invention, other modifications thereof will readily occur to those skilled in the art, and we therefore wish our invention to be limited only by the appended claims.

We claim:

1. An electrical control circuit for the reduction of undesirable quadrature and stray signal effects comprising; a bridge means for providing a first source of control signal potential of variable magnitude; a suitably adjustable second source of alternating signal potential of the same frequency and normally substantially larger than said first signal; a first electronic valve of the gated beam type, having an anode, a cathode, a limiter control electrode and a quadrature control electrode, said limiter and said quadrature electrodes having substantially equal control over the output of said valve; means connecting said first signal source to said limiter electrode; means connecting said second signal source to said quadrature electrode; a second electronic valve having an anode, a cathode, and a control electrode, means connecting the output of said first valve to the control electrode of said second valve, the output of said first valve being the resultant of the two signals and of substantially the same wave form of said second signal and being substantially free from distortion arising from sources other than said first signal source, force rebalance relay means connected to the output of said second valve; transformer means having a primary winding and a plurality of secondary windings, said primary winding having a capacitor serially connected to provide a regulated output to said secondary windings, said secondary windings being adapted to supply voltages to said signal sources and valves; and rectifying and filter means connected to at least one of said secondary windings and adapted to supply a direct current to at least a portion of said circuit.

2. An electrical control circuit for the reduction of undesirable quadrature and stray signal effects comprising; a first source of control signal potential of variable magnitude; a suitably adjustable second source of alternating signal potential having the same frequency and normally substantially larger than said first signal; an electronic valve having a plurality of elements including an anode, a cathode, a limiter electrode or first control electrode and a quadrature electrode or second control electrode, said quadrature and limiter electrodes having substantially equal authority over the conduction of said valve; means connecting said first signal source to said first limiter control electrode; means connecting said second signal source to said second quadrature control electrode; whereby the output of said first valve is the resultant of said signals and of substantially the same wave form of said second signal and substantially free from distortion arising from sources other than said first signal source; transformer means having a primary winding and a plurality of secondary windings, said primary winding having a capacitor serially connected to provide a regulated output to said secondary windings, said secondary windings adapted to supply voltages to said signal sources and said valve; and rectifying and filter means connected to at least one of said secondary windings and adapted to supply a direct current to at least a portion of said circuit.

3. An electrical control circuit for the reduction of undesirable quadrature and stray signal effects comprising; a first source of control signal potential of variable magnitude; a suitably adjustable second source of alternating signal potential having the same frequency and normally substantially larger than said first signal; a first electronic valve having a plurality of elements including an anode, a cathode, and first and second control electrodes, said valve being constructed in such manner that said first and said second control electrodes have substantially equal control over the output of said valve; means connecting said first signal source to said first control electrode; means connecting said second signal source to said second control electrode; a second electronic valve having an anode, a cathode, and a control electrode; means connecting the output of said first valve to the control electrode of said second valve, the output of said first valve being the resultant of the two signals and substantially the same wave form of said second signals and substantially free from distortion arising from sources other than said first signal source; output means connected to said second valve; transformer means having a primary winding and a plurality of secondary windings, said primary windings having a capacitor serially connected, said second windings having a regulated output and adapted to supply voltages to said signal sources and valves; and rectifying and filter means connected to at least one of said secondary windings and adapted to supply a direct current to at least a portion of said circuit.

4. An electrical control circuit for the reduction of undesirable quadrature and stray signal effects comprising; a first source of control signal potential of variable magnitude; a suitably adjustable second source of alternating signal potential of the same frequency and normally substantially larger than said first signal; a gated beam type electronic valve; means connecting said first signal source to said electronic valve; means connecting said second signal source to said electronic valve; a second electronic valve having an anode, a cathode, and a control electrode; means connecting the output of said gated beam type electronic valve to the control electrode of said second valve, the output of said gated beam type electronic valve being the resultant of the two signals and of substantially the same wave form of said second signal and being substantially free from distortion arising from sources other than said first signal source; output means connected to said second valve; transformer means having a primary winding and a plurality of secondary windings, said primary winding having a capacitor serially connected, said secondary windings having a regulated output and adapted to supply voltages to said signal sources and valves; and rectifying and filter means connected to at least one of said secondary windings, and adapted to supply a direct current to at least a portion of said circuit.

5. An electrical control circuit for the reduction of undesirable quadrature and stray signal effects comprising; a source of alternating potential of substantially constant magnitude; electronic valve means energized from said source of alternating potential and having output terminals and at least first and second input terminals, said input terminals having substantially equal influence on the output of said electronic valve means; a first source of control signal potential, energized from said source of alternating potential, and being of variable magnitude and reversible in phase so that it is in phase or 180° out of phase therewith; a second source of alternating signal potential, energized from said source of alternating potential, and being of a magnitude substantially greater than that of said first source of control signal potential and of a constant phase that is either in phase or 180° out of phase with said source of alternating potential so that said first signal may be in phase or 180° out of phase with said second signal; means connecting said first source of signal potential to said first input terminal; means connecting said second source of signal potential to said second input terminal; output utilization means; means connecting said output utilization means to the output terminals of said electronic valve whereby the output of said valve means is the resultant of said signals and of substantially the same wave form as said second source of signal potential and substantially free from distortion arising from sources other than said first signal source.

6. In combination; a source of alternating current; a first source of alternating signal potential, energized from said source of alternating current, for producing a signal potential of reversible phase and variable magnitude; a second source of alternating signal potential, energized from said source of alternating current, for providing a signal potential of constant phase and magnitude so that said first signal may be in phase or 180° out of phase with said second signal; signal combining and amplifying means, energized from said source of alternating current having input terminals connected to said sources of alternating signal potential, for producing a third alternating signal of the same frequency and phase as said second alternating signal and of varying magnitude in accordance with said source of alternating current and the magnitude and phase of said first signal; and control means, connected to the output of said signal combining and amplifying means, and responsive to the variation in amplitude of said third signal for controlling the operation of a load device in accordance with the phase and magnitude of said signal.

7. In combination: a source of alternating current energy of substantially constant amplitude; a first source of signal potential, energized from said source of alternating current, and of reversible phase and variable magnitude; a second source of alternating signal potential, energized from said source of alternating current so that a constant phase relationship with said source of alternating current is maintained whereby said first source of signal is in phase or 180° out of phase with said second signal, said second signal being normally substantially larger than said first source of signal; signal combining means for producing a third signal of like frequency and phase as said second signal and of varying magnitude in accordance with the magnitude and phase of said first said last named means; and control means responsive to the output thereof for controlling the operation of a load in accordance with the phase and magnitude of said first signal.

References Cited in the file of this patent
UNITED STATES PATENTS

| | | |
|---|---|---|
| 2,476,496 | Kliever | July 19, 1949 |
| 2,511,680 | Warrington | June 13, 1950 |
| 2,694,162 | English | Nov. 9, 1954 |
| 2,695,977 | Hupert | Nov. 30, 1954 |
| 2,697,808 | MacNichol et al. | Dec. 21, 1954 |
| 2,712,232 | Pfeiffer | July 5, 1955 |
| 2,747,146 | McDonald | May 22, 1956 |
| 2,788,483 | Doll | Apr. 9, 1957 |
| 2,790,943 | Woodward | Apr. 30, 1957 |